United States Patent
Wang et al.

(10) Patent No.: US 12,187,279 B2
(45) Date of Patent: Jan. 7, 2025

(54) METHOD AND SYSTEM FOR PERSONALIZED CAR FOLLOWING WITH TRANSFORMERS AND RNNS

(71) Applicant: Toyota Motor Engineering & Manufacturing North America, Inc., Plano, TX (US)

(72) Inventors: Ziran Wang, San Jose, CA (US); Kyungtae Han, Palo Alto, CA (US); Rohit Gupta, Santa Clara, CA (US)

(73) Assignees: Toyota Motor Engineering & Manufacturing North America, Inc., Plano, TX (US); Toyota Jidosha Kabushiki Kaisha, Aichi-ken (JP)

( * ) Notice: Subject to any disclaimer, the term of this patent is extended or adjusted under 35 U.S.C. 154(b) by 205 days.

(21) Appl. No.: 17/936,655

(22) Filed: Sep. 29, 2022

(65) Prior Publication Data

US 2024/0123987 A1     Apr. 18, 2024

(51) Int. Cl.
| | |
|---|---|
| *B60W 30/16* | (2020.01) |
| *B60W 30/14* | (2006.01) |
| *B60W 40/105* | (2012.01) |
| *B60W 50/00* | (2006.01) |
| *G06N 3/049* | (2023.01) |
| *G06N 3/08* | (2023.01) |

(52) U.S. Cl.
CPC .......... *B60W 30/16* (2013.01); *B60W 30/143* (2013.01); *B60W 40/105* (2013.01); *B60W 50/0097* (2013.01); *G06N 3/049* (2013.01); *G06N 3/08* (2013.01); *B60W 2554/4042* (2020.02); *B60W 2554/802* (2020.02); *B60W 2556/45* (2020.02)

(58) Field of Classification Search
CPC .. B60W 30/16; B60W 30/143; B60W 40/105; B60W 50/0097; B60W 2554/4042; B60W 2556/45; B60W 2554/802; G06N 3/049; G06N 3/08
See application file for complete search history.

(56) References Cited

U.S. PATENT DOCUMENTS

| | | | |
|---|---|---|---|
| 9,266,533 B2 | 2/2016 | Zhao | |
| 10,777,084 B1* | 9/2020 | Vora | ................. G08G 1/22 |
| 11,860,634 B2* | 1/2024 | Pan | ................. G06V 10/44 |

(Continued)

FOREIGN PATENT DOCUMENTS

| | | |
|---|---|---|
| CN | 108216233 B | 10/2019 |
| CN | 110386139 B | 8/2020 |

(Continued)

*Primary Examiner* — Naeem Taslim Alam
(74) *Attorney, Agent, or Firm* — DINSMORE & SHOHL LLP (57) ABSTRACT

A method may include receiving training data comprising a time series of gaps between an ego vehicle and one or more lead vehicles at a plurality of time steps, embedding the training data into a fixed-length sequence, inputting the fixed-length sequence into a Transformer-RNN model comprising a Transformer component and an RNN component, wherein the transformer component applies attention to each data point of the fixed-length sequence based on a fixed number of previous inputs, and training the Transformer-RNN model, using the training data, to output a predicted gap at a future time step based on an input sequence of gaps.

15 Claims, 9 Drawing Sheets

(56) References Cited

U.S. PATENT DOCUMENTS

| | | | |
|---|---|---|---|
| 2019/0092168 A1 | 3/2019 | Burtch et al. | |
| 2021/0158549 A1* | 5/2021 | Veeravasarapu | G06N 3/045 |
| 2021/0201504 A1* | 7/2021 | Xu | G05D 1/0221 |
| 2022/0219695 A1* | 7/2022 | Satti | B60W 40/09 |
| 2022/0292971 A1* | 9/2022 | Park | G06V 20/586 |
| 2022/0324490 A1* | 10/2022 | Akash | G06V 20/56 |
| 2023/0045550 A1* | 2/2023 | Li | G06V 10/82 |
| 2023/0053785 A1* | 2/2023 | Carvalho | G06V 10/776 |
| 2023/0396817 A1* | 12/2023 | Mittal | G06V 10/82 |
| 2024/0025445 A1* | 1/2024 | Jiang | G06N 3/0464 |
| 2024/0083421 A1* | 3/2024 | Fu | G06V 10/143 |
| 2024/0092397 A1* | 3/2024 | Carter | B60W 50/0097 |
| 2024/0104934 A1* | 3/2024 | Pronovost | G06V 20/58 |
| 2024/0152750 A1* | 5/2024 | Schockaert | G05B 13/0265 |

FOREIGN PATENT DOCUMENTS

| | | |
|---|---|---|
| CN | 112193245 B | 9/2021 |
| DE | 102020107282 B4 | 10/2021 |

* cited by examiner

| Dataset | Baselines | | Non-sequential | | Sequential | | | | | |
|---|---|---|---|---|---|---|---|---|---|---|
| | Copy | Linear | MLP | MLP HORIZON | RNN | Trans-former* | GAP-FORMER* | RNN HORIZON | Transformer HORIZON* | the Transformers-RNN's algorithm HORIZON* |
| Open-ACC | 5.9707 | 4.4492 | 5.0851 | 4.7169 | 3.2906 | 3.5557 | 3.4146 | 3.1067 | 3.0031 | 2.927 |
| Proprietary | 4.9821 | 6.9529 | 4.4467 | 4.2437 | 4.3217 | 4.1989 | 4.1522 | 4.2167 | 4.1154 | 4.077 |

METHOD AND SYSTEM FOR PERSONALIZED CAR FOLLOWING WITH TRANSFORMERS AND RNNS

TECHNICAL FIELD

The present specification relates to autonomous driving and more particularly to a method and system for personalized car following with Transformers and RNNs.

BACKGROUND

Autonomous or semi-autonomous vehicles may perform certain driving functions without any input by the driver. In particular, cruise control functionality may allow a driver to set a desired speed for a vehicle and cause the vehicle to maintain the desired speed without the driver utilizing the accelerator or brake pedals. Adaptive cruise control (ACC) functionality may similarly cause a vehicle to maintain a desired speed while also maintaining a certain following distance from other vehicles. That is, an ACC system may cause a vehicle to slow down from the desired speed if another vehicle is detected within a threshold distance in front of the vehicle.

Thus, ACC may allow a driver to maintain a constant speed while driving a vehicle, while also keeping the vehicle a certain distance behind other vehicles to prevent collisions. However, different drivers may have different naturalistic driving behaviors when following other vehicles while driving manually. For example, different drivers may have different desired following distances, and different desired rates of acceleration or deceleration when a change of speed is needed. Furthermore, drivers may have different driving behaviors at different times of day and in different driving conditions. As such, a typical ACC system may exhibit driving behavior that is different than the naturalistic driving behavior of a driver, which may be uncomfortable for the driver. Therefore, personalized adaptive cruise control (P-ACC) may be desired, which mimics the naturalistic driving behavior of a driver. Accordingly, a need exists for improved methods and systems for P-ACC.

SUMMARY

In an embodiment, a method may include receiving training data comprising a time series of gaps between an ego vehicle and one or more lead vehicles at a plurality of time steps, embedding the training data into a fixed-length sequence, and inputting the fixed-length sequence into a Transformer-RNN model comprising a Transformer component and an RNN component, and training the Transformer-RNN model, using the training data, to output a predicted gap at a future time step based on an input sequence of gaps. The Transformer component may apply attention to each data point of the fixed-length sequence based on a fixed number of previous inputs.

In another embodiment, a remote computing device may include a controller. The controller may be programmed to receive training data comprising a time series of gaps between an ego vehicle and one or more lead vehicles at a plurality of time steps, embed the training data into a fixed-length sequence, input the fixed-length sequence into a Transformer-RNN model comprising a Transformer component and an RNN component, and train the Transformer-RNN model, using the training data, to output a predicted gap at a future time step based on an input sequence of gaps. The Transformer component may apply attention to each data point of the fixed-length sequence based on a fixed number of previous inputs.

In another embodiment, a system may include a vehicle and a remote computing device. The vehicle may include one or more vehicle sensors configured to collect sensor data comprising at least a distance between the vehicle and a lead vehicle being followed by the vehicle at a plurality of time steps. The remote computing device may include a controller programmed to receive the sensor data from the vehicle, input the sensor data into a trained Transformer-RNN model to predict a gap between the vehicle and the lead vehicle at a future time step based on an output of the trained Transformer-RNN model, determine a driving action to be performed by the vehicle to achieve the predicted gap at the future time step, and cause the vehicle to perform the determined driving action. The Transformer-RNN model may include a Transformer component and an RNN component.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

The embodiments disclosed herein include a method and system for personalized car following with Transformers and recurrent neural networks (RNNs). Many modern vehicles are equipped with ACC systems, which automatically control an ego vehicle when following another vehicle. These ACC systems may gather a variety of sensor data (e.g., radar sensor data, LIDAR sensor data, camera data) and adjust the driving behavior of the ego vehicle based on the acquired sensor data to maintain a preferred following distance between the ego vehicle and a preceding vehicle that the ego vehicle is following. However, typical ACC systems will either maintain the same following distance for all drivers or will allow a driver to select at most a few different options for a desired following distance. Thus, a driver's personal preference with respect to following distance and driving behavior when following a vehicle are not considered by typical ACC systems.

In embodiments disclosed herein, systems and methods are provided to personalize ACC functionality, thereby providing P-ACC functionality. In particular, in embodiments disclosed herein, a driver's preferred driving behavior when following another vehicle is inferred dynamically based on the driver's naturalistic driving tendencies (e.g., historical driving data obtained when the driver is manually driving the ego vehicle without the use of an ACC system). As such, a P-ACC system can control a vehicle to follow another vehicle while mimicking the driving behavior (e.g., desired speed and following distance) of the driver.

In embodiments, a driver's historical naturalistic driving is used to train a model to predict the driver's driving actions for a given situation when following another driver. In particular, a model based on Transformers and RNNs is used, as disclosed herein. The model has the benefits of both Transformers and RNNs. Once the model is trained, the trained model may be used by a P-ACC system to control the ego vehicle when following another vehicle so as to mimic the naturalistic driving tendencies of the driver, thereby making the driver more comfortable.

Figure 1:
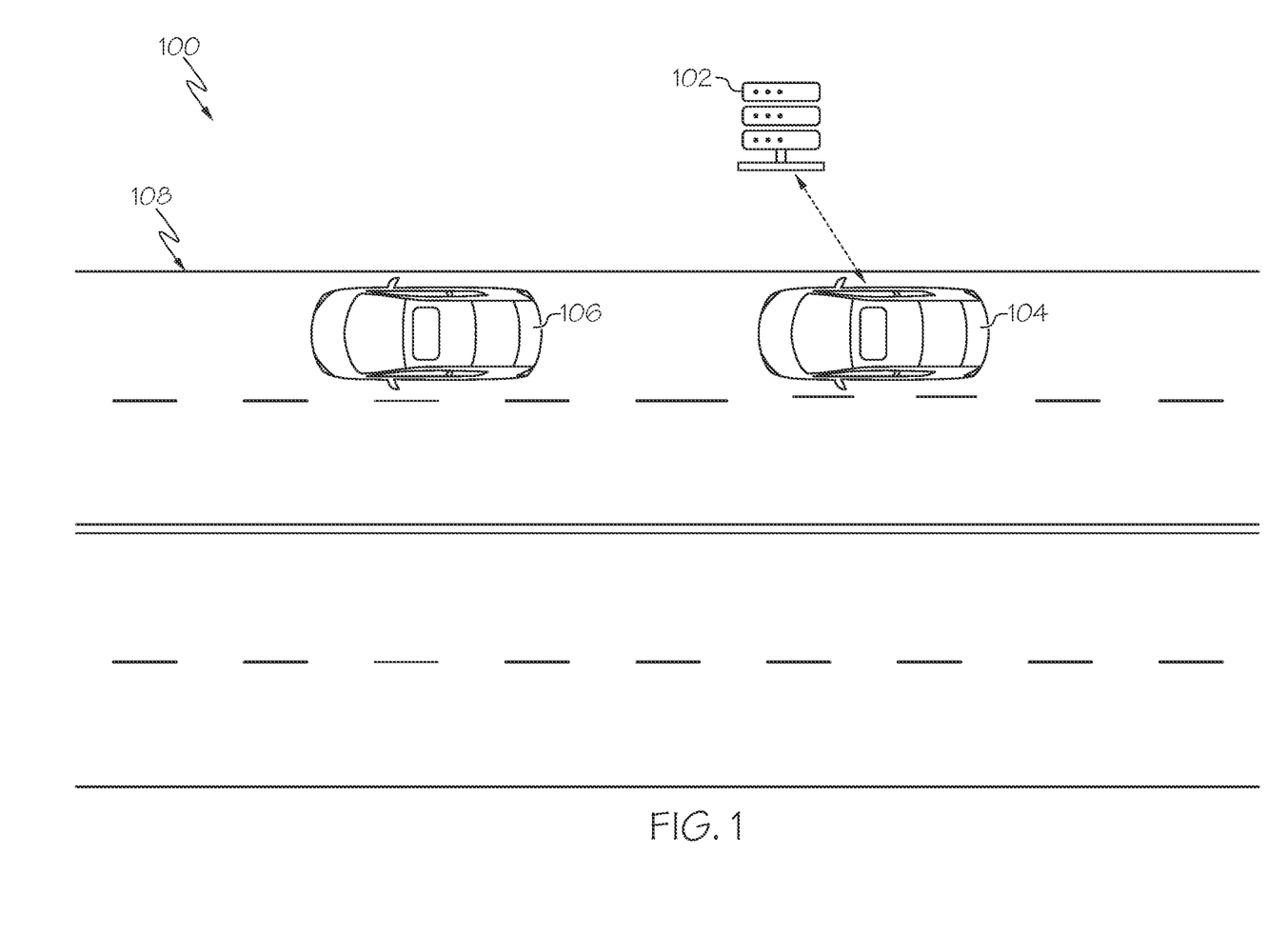
FIG. 1 schematically depicts a system comprising a P-ACC server, according to one or more embodiments shown and described herein.

Turning now to the figures, FIG. 1 schematically depicts a system for personalized car following with a Transformer-RNN architecture. In the example of FIG. 1, a system 100 includes a P-ACC server 102. The P-ACC server 102 may receive data from connected vehicles and may utilize a Transformer-RNN architecture to implement P-ACC, as disclosed herein. In the example of FIG. 1, an ego vehicle 104 drives behind a lead vehicle 106 along a road 108.

In the example of FIG. 1, the ego vehicle 104 may be manually driven by a driver and may have a P-ACC system, as disclosed herein. In the example of FIG. 1, the ego vehicle 104 is a connected vehicle. A connected vehicle is able to communicate remotely with systems outside of the vehicle (e.g., with the P-ACC server 102).

The P-ACC server 102 may be communicatively coupled to the ego vehicle 104. While the example of FIG. 1 illustrates a single ego vehicle 104 being communicatively coupled to the P-ACC server 102, in other examples, any number of connected vehicles may be communicatively coupled to the P-ACC server 102. As disclosed herein, the P-ACC server 102 may control P-ACC for the ego vehicle 104. In particular, the P-ACC server 102 may receive historical driving data for a driver while the driver performs naturalistic driving while following another vehicle. This historical driving data may be used as training data to train a Transformer-RNN model maintained by the P-ACC server 102. The trained model may then be used to determine driving operations for the ego vehicle 104 during on-line operation of P-ACC. In some embodiments, the Transformer-RNN model may be maintained by the ego vehicle 104.

In the illustrated example, the P-ACC server 102 comprises a cloud computing device. In some examples, the P-ACC server 102 may comprise a road-side unit (RSU) positioned near the road 108. In these examples, the system 100 may include any number of RSUs spaced along the road 108 such that each RSU covers a different service area. That is, as the ego vehicle 104 or other vehicles drive along the road 108, the vehicles may be in range of different RSUs at different times such that different RSUs provide coverage at different locations. Thus, as the ego vehicle 104 drives along the road 108, the ego vehicle 104 may move between coverage areas of different RSUs.

In other examples, the P-ACC server 102 may be another type of server or remote computing device and may be positioned remotely from the road 108. In some examples, the P-ACC server 102 may be an edge server. In some examples, the P-ACC server 102 may be a moving edge server, such as another vehicle.

Figure 2:
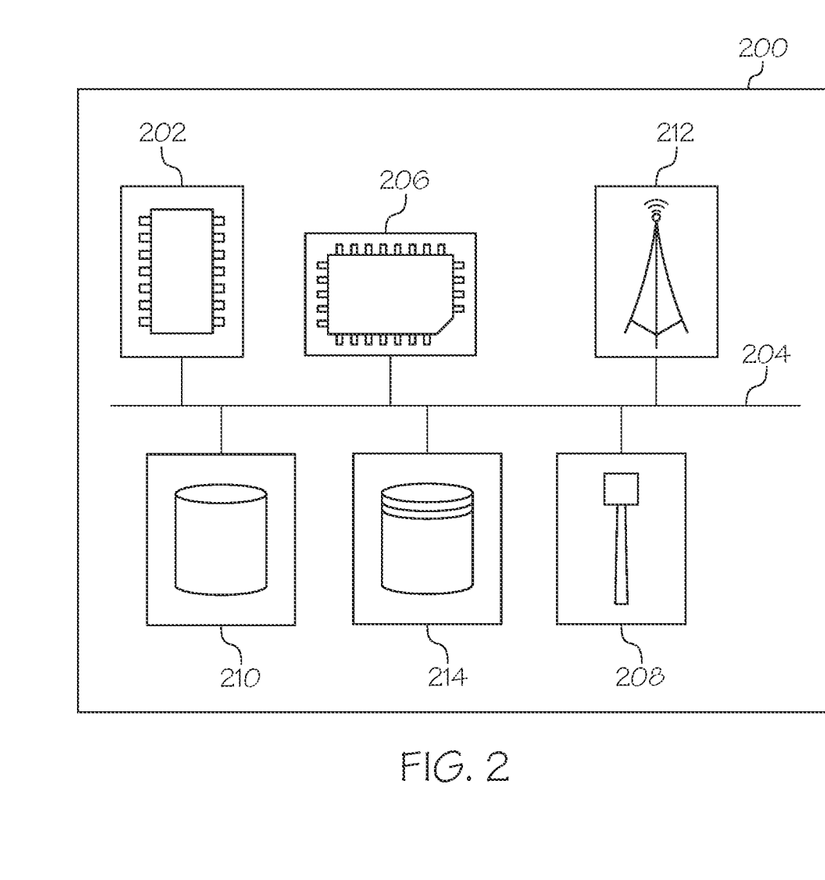
FIG. 2 depicts a schematic diagram of a vehicle system, according to one or more embodiments shown and described herein.

FIG. 2 depicts a vehicle system 200 that may be included in the ego vehicle 104 of FIG. 1. In the example of FIG. 2, the vehicle system 200 includes one or more processors 202, a communication path 204, one or more memory modules 206, a satellite antenna 208, one or more vehicle sensors 210, a network interface hardware 212, and a data storage component 214, the details of which will be set forth in the following paragraphs.

Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the vehicle system 200. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In some embodiments, the communication path 204 may facilitate the transmission of wireless signals, such as Wi-Fi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

Referring still to FIG. 2, the vehicle system 200 comprises a satellite antenna 208 coupled to the communication path 204 such that the communication path 204 communicatively couples the satellite antenna 208 to other modules of the vehicle system 200. The satellite antenna 208 is configured to receive signals from global positioning system satellites. Specifically, in one embodiment, the satellite antenna 208 includes one or more conductive elements that interact with electromagnetic signals transmitted by global positioning system satellites. The received signal is transformed into a data signal indicative of the location (e.g., latitude and longitude) of the satellite antenna 208, and consequently, the vehicle containing the vehicle system 200.

The vehicle system 200 comprises one or more vehicle sensors 210. Each of the one or more vehicle sensors 210 is coupled to the communication path 204 and communicatively coupled to the one or more processors 202. The one or more vehicle sensors 210 may include, but are not limited to, LiDAR sensors, RADAR sensors, optical sensors (e.g., cameras, laser sensors), proximity sensors, location sensors (e.g., GPS modules), and the like. In embodiments, the vehicle sensors 210 may monitor the surroundings of the vehicle and may detect positions, trajectories, velocities, and accelerations of other vehicles. The vehicle sensors 210 may also detect road geometry and other traffic features. In some examples, the vehicle sensors 210 may also detect weather conditions and other environmental data. The data captured by the vehicle sensors 210 may be stored in the data storage component 214.

Still referring to FIG. 2, the vehicle system 200 comprises network interface hardware 212 for communicatively coupling the vehicle system 200 to the P-ACC server 102. The network interface hardware 212 can be communicatively coupled to the communication path 204 and can be any device capable of transmitting and/or receiving data via a network. Accordingly, the network interface hardware 212 can include a communication transceiver for sending and/or receiving any wired or wireless communication. For example, the network interface hardware 212 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 212 includes hardware configured to operate in accordance with the Bluetooth® wireless communication protocol. In embodiments, the network interface hardware 212 of the vehicle system 200 may transmit data about objects detected by the vehicle system 200, as disclosed in further detail below.

Still referring to FIG. 2, the vehicle system 200 comprises a data storage component 214. The data storage component 214 may store data used by various components of the vehicle system 200. In addition, the data storage component 214 may store data collected by the vehicle sensors 210.

In some embodiments, the vehicle system 200 may be communicatively coupled to the P-ACC server 102 by a network. In one embodiment, the network may include one or more computer networks (e.g., a personal area network, a local area network, or a wide area network), cellular networks, satellite networks and/or a global positioning system and combinations thereof. Accordingly, the vehicle system 200 can be communicatively coupled to the network via a wide area network, via a local area network, via a personal area network, via a cellular network, via a satellite network, etc. Suitable local area networks may include wired Ethernet and/or wireless technologies such as, for example, Wi-Fi. Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

The vehicle system 200 includes an actuator such as an engine, a motor, or any other powertrain to accelerate or decelerate the vehicle. Specifically, the one or more processors 202 may control the actuator to accelerate or decelerate the vehicle based on determined driving action received from the P-ACC server 102.

Figure 3:
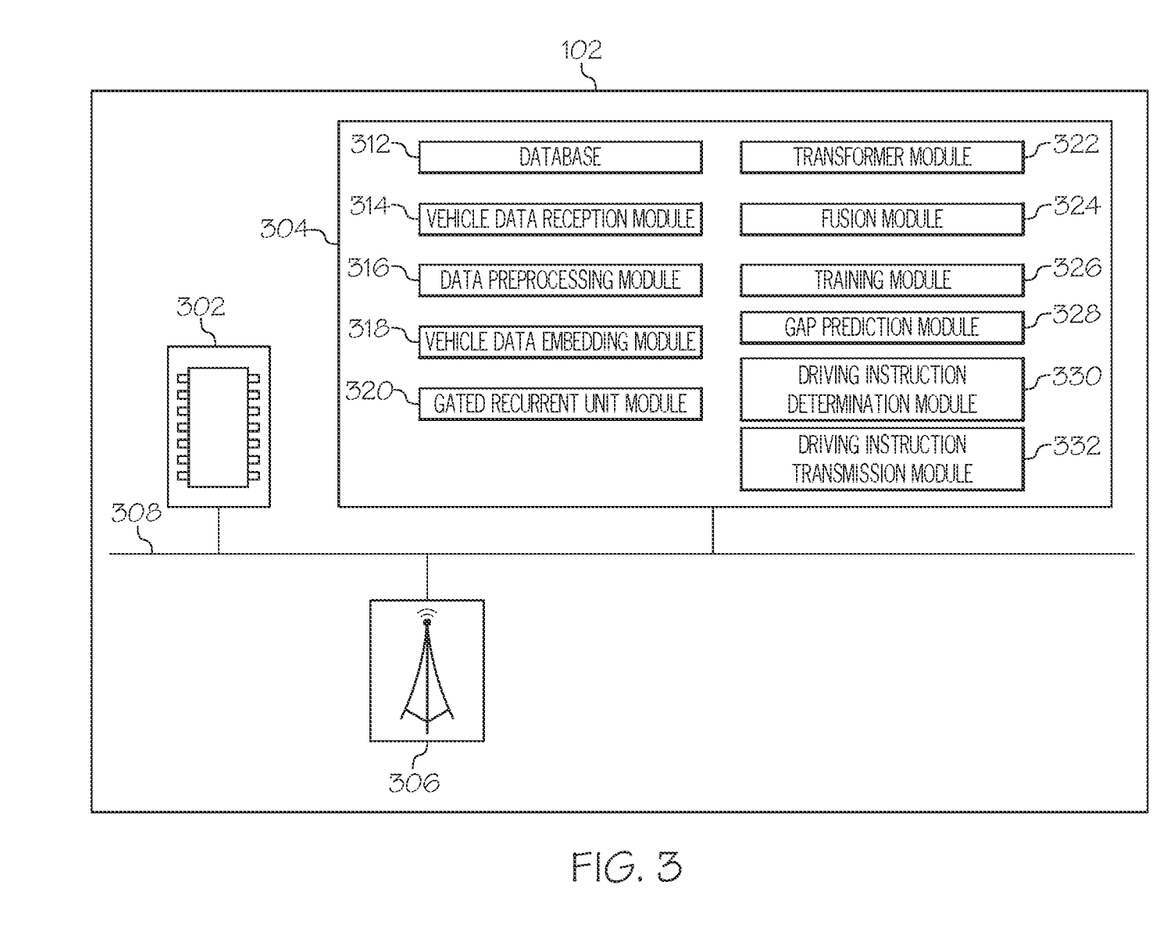
FIG. 3 depicts a schematic diagram of the P-ACC server of FIG. 1, according to one or more embodiments shown and described herein.

Now referring to FIG. 3, the P-ACC server 102 comprises one or more processors 302, one or more memory modules 304, network interface hardware 306, and a communication path 308. The one or more processors 302 may be a controller, an integrated circuit, a microchip, a computer, or any other computing device. The one or more memory modules 304 may comprise RAM, ROM, flash memories, hard drives, or any device capable of storing machine readable and executable instructions such that the machine readable and executable instructions can be accessed by the one or more processors 302.

The network interface hardware 306 can be communicatively coupled to the communication path 308 and can be any device capable of transmitting and/or receiving data via a network. Accordingly, the network interface hardware 306 can include a communication transceiver for sending and/or receiving any wired or wireless communication. For example, the network interface hardware 306 may include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 306 includes hardware configured to operate in accordance with the Bluetooth® wireless communication protocol. The network interface hardware 306 of the P-ACC server 102 may transmit and receive data to and from vehicles (e.g., the ego vehicle 104 of FIG. 1).

The one or more memory modules 304 include a database 312, a vehicle data reception module 314, a data preprocessing module 316, a vehicle data embedding module 318, a gated recurrent unit module 320, a Transformer module 322, a fusion module 324, a training module 326, a gap prediction module 328, and a driving instruction determination module 330, and a driving instruction transmission module 332. Each of the database 312, the vehicle data reception module 314, the data preprocessing module 316, the vehicle data embedding module 318, the gated recurrent unit module 320, the Transformer module 322, the fusion module 324, the training module 326, the gap prediction module 328, the driving instruction determination module 330, and the driving instruction transmission module 332 may be a program module in the form of operating systems, application program modules, and other program modules stored in the one or more memory modules 304. In some embodiments, the program module may be stored in a remote storage device that may communicate with the P-ACC server 102. In some embodiments, one or more of the database 312, the vehicle data reception module 314, the data preprocessing module 316, the vehicle data embedding module 318, the gated recurrent unit module 320, the Transformer module 322, the fusion module 324, the training module 326, the gap prediction module 328, and the driving instruction determination module 330, and the driving instruction transmission module 332 may be stored in the one or more memory modules 206 of the vehicle system 200 of a vehicle. Such a program module may include, but is not limited to, routines, subroutines, programs, objects, components, data structures and the like for performing specific tasks or executing specific data types as will be described below.

The database 312 may store data received from the ego vehicle 104. The data stored in the database 312 may be used by the other memory modules 304, as disclosed herein. The database 312 may also store parameters for the trained Transformer-RNN model maintained by the P-ACC server 102, as disclosed herein. The database 312 may also store other data used by the memory modules 304.

The vehicle data reception module 314 may receive data from vehicles (e.g., from the ego vehicle 104 of FIG. 1). As discussed above, historical driving data for a driver performing naturalistic driving while following another vehicle may be used as training data to train a Transformer-RNN model maintained by the P-ACC server 102. As such, the vehicle data reception module 314 may receive historical driving data that may be used to train the Transformer-RNN model maintained by the P-ACC server 102. In particular, the vehicle data reception module 314 may receive driving data associated with vehicle following behavior (e.g., the example of FIG. 1, where the ego vehicle 104 is following the lead vehicle 106). The driving data received by the vehicle data reception module 314 may include data at a plurality of time steps including speeds and accelerations of the ego vehicle 104 and the lead vehicle 106, a distance gap between the ego vehicle 104 and the lead vehicle 106, and the like. The vehicle data reception module 314 may also receive other data associated with vehicle following events such as weather, vehicle type, road geometry, and the like.

The data described above received by the vehicle data reception module 314 to be used to train the Transformer-RNN may be received in an off-line manner. That is, the data need not be received in real-time while it is being collected or while a P-ACC system is in operation. As such, the Transformer-RNN model can be trained in an off-line manner. In addition, the vehicle data reception module 314 may also receive vehicle data in an on-line manner. That is, vehicle data may be received from the ego vehicle 104 in real-time as it is being collected while the P-ACC system is in operation. As such, the data received by the vehicle data reception module 314 during on-line operation may be used to determine driving actions to be taken by the ego vehicle 104 in order to implement P-ACC, as disclosed in further detail below.

Figure 4:
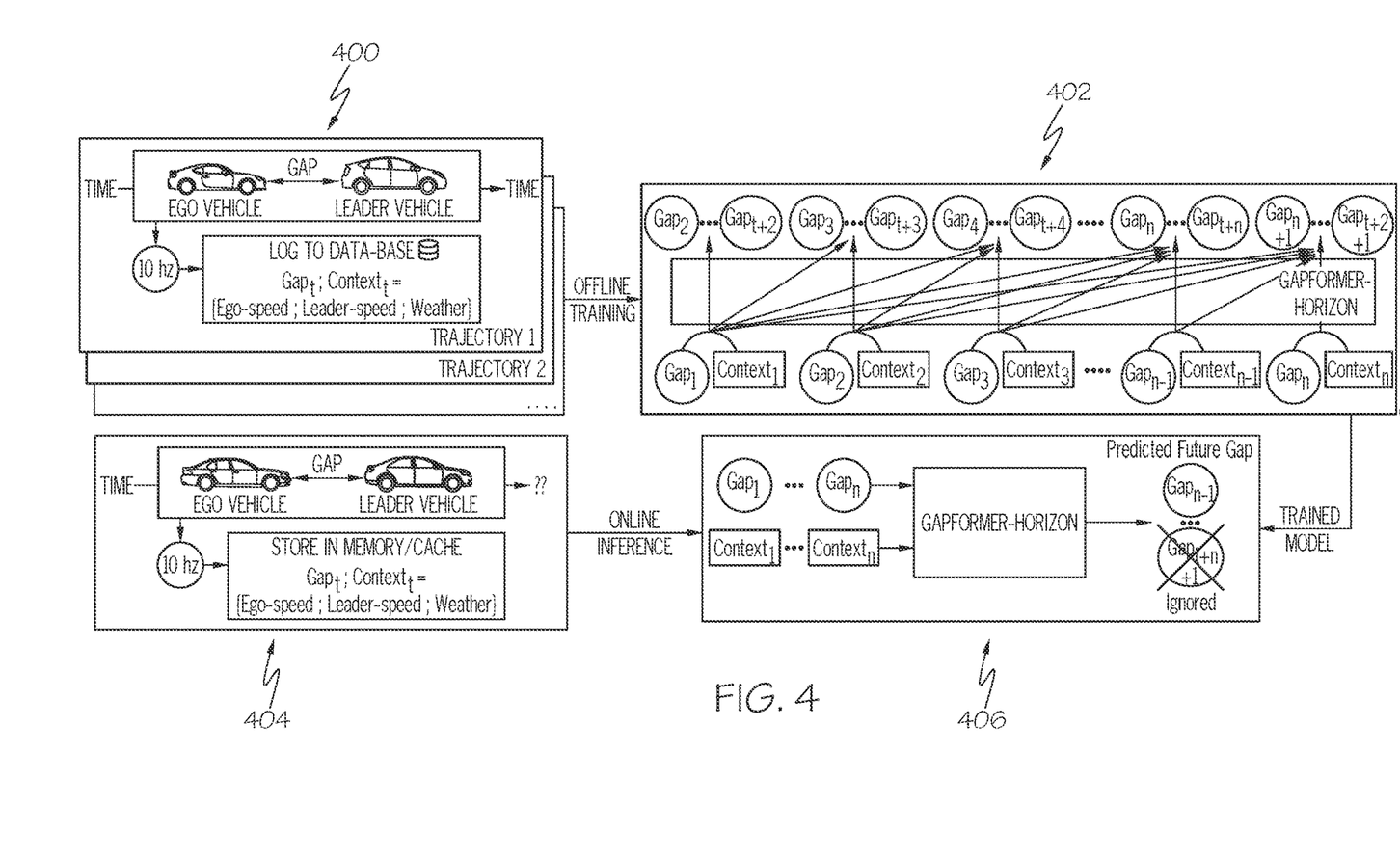
FIG. 4 illustrates an architecture of a Transformer-RNN model maintained by the P-ACC server of FIGS. 1 and 3, according to one or more embodiments shown and described herein.

FIG. 4 illustrates an example system architecture of the P-ACC framework disclosed herein. Block 400 illustrates training data being collected from an ego vehicle following a leader vehicle. Block 402 illustrates off-line training of the Transformer-RNN model using the training data. Block 404 illustrates data being collected for on-line operation of the P-ACC system. Block 406 illustrates using the on-line data with the trained model to predict a future gap between the ego vehicle and the leader vehicle. The ego vehicle 104 may then be controlled to cause the ego vehicle to accelerate or decelerate an appropriate amount to achieve the predicted gap at the next time step.

Referring back to FIG. 3, the data preprocessing module 316 may perform preprocessing of data received by the vehicle data reception module 314. In particular, the data preprocessing module 316 may extract the appropriate data to be used to train the Transformer-RNN model. In embodiments, the Transformer-RNN model may be trained using a time series of gap information between a vehicle and a lead vehicle and a time series of contextual data associated with a particular driver. The gap information may comprise a distance between a vehicle being driven by a particular driver and a lead vehicle being followed for a plurality of time steps. The contextual data may include additional data as disclosed herein.

In one examples, the contextual data used to train the Transformer-RNN model only includes contextual features which are not directly dependent on the logging policy. In particular, the data preprocessing module 316 may include features such as the speed of the lead vehicle, current weather, and a vehicle type. The data preprocessing module 316 may remove features such as the speed and acceleration of the ego vehicle. The features removed by the data preprocessing module 316 share a causal link by the gap predictions made by the Transformer-RNN model and may cause data-leakage when making predictions. However, in other examples, the data preprocessing module 316 may include some of this data (e.g., ego vehicle speed) in the preprocessed data.

As such, the data preprocessing module 316 may extract gap data and contextual data from the data received by the vehicle data reception module 314. In particular, for a given driver u, the data preprocessing module 316 may extract a chronological sequence of gaps between the vehicle driven by the driver u and a lead vehicle represented as $G^u=(G_1^u, G_2^u, \ldots, G_{|G^u|}^u)$ where $G_i^u \in \mathbb{R}^+ \; \forall i \in [1, |G^u|]$. The data preprocessing module 316 may also extract a chronological sequence of contextual data represented as $C^u=(C_1^u, C_2^u, \ldots, C_{|G^u|}^u)$ where $C_i^u \in \mathbb{R}^c \; \forall i \in [1, |G^u|]$. In some examples, the contextual data may include a speed of the lead vehicle. In some examples, the contextual data may include weather data. In other examples, the contextual data may include other data received by the vehicle data reception module 314. As discussed in further detail below, the Transformer-RNN model maintained by the P-ACC server 102 may be trained to predict, for any sequences $G^u$ and $C^u$, the next gap for the driver, $G_{|G^u|+1}^u \in \mathbb{R}^+$.

The vehicle data embedding module 318 may perform an embedding of the data prepared by the data preprocessing module 316 to be input into the Transformer-RNN model. In particular, for a gap sequence $G^u$ and a context sequence $C^u$, both sequences are initially transformed to have a fixed length n. In some examples, the length n may be predefined or set by a user. In other examples, the length n may be a hyper-parameter that may be tuned. In embodiments, if $|G^u|>n$, the vehicle data embedding module 318 retains the most recent n actions from each sequence. Otherwise, the vehicle data embedding module 318 pads each sequence with an appropriate number of padding elements from the left.

After adjusting the gap and context sequences to have length n, the vehicle data embedding module 318 concatenates them followed by an affine Multi-Layer Perceptron (MLP) transformation to obtain an intermediate representation:

$$\hat{S}^u = (W_e^T \cdot (G_i^u \| C_i^u) + b_e | \forall i \in [1, |G^u|]),$$

where $W_e \in \mathbb{R}^{(c+1) \times d}$ and $b_e \in \mathbb{R}$ represent the parameters of the embedding transformation, and '$\|$' represents the concatenation operation. The vehicle data embedding module 318 may also inject a learnable position embedding, which is meant to inherently learn the dynamics of different positions through an embedding matrix $P_e \in \mathbb{R}^{n \times d}$ to get the final input embedding $S^u = \hat{S}^u + P_e^T$.

After the vehicle data embedding module 318 performs an embedding of the data prepared by the data preprocessing module 316, the embedded data may be used to train the Transformer-RNN model maintained by the P-ACC server 102 as disclosed herein. As discussed above, the Transformer-RNN model uses an algorithm that combines the sequence modeling capabilities of a Transformer and an RNN for driver trajectory modeling. This algorithm may lead to better performance than using either a Transformer or RNN individually. In particular, the gated recurrent unit (GRU) module 320 may implement the RNN portion of the Transformer-RNN model and the Transformer module 322 may implement the Transformer portion of the Transformer-RNN model, as disclosed herein.

The GRU module 320 may implement the RNN portion of the Transformer-RNN model by implementing a GRU using the data embedded by the vehicle data embedding module 318, as disclosed herein. In particular, given the embedded input sequence $S^u$, the GRU module 320 may employ a gated recurrent unit (GRU) to embed the input sequence $S^u$ into a lower dimensional latent space. In particular, the GRU may maintain a hidden-state vector $h_t \in \mathbb{R}^d$ for each time step in the sequence, and the GRU module 320 may update it as $h_{t+1} = \text{GRU}(h_t, S_t^u)$, where the function GRU represents a standard set of update-gate and reset-gate equations for a gated recurrent unit. The GRU module 320 may then obtain a fixed-size representation of the entire sequence by extracting only the last hidden-state as processed by the GRU, $\varepsilon_{GRU} := h_{|G_u|}$.

The Transformer module 322 may implement the Transformer component of the Transformer-RNN model as disclosed herein. The Transformer module 322 may use the same embedded input sequence $S^u$ as the GRU module 320. The Transformer module 322 first performs multi-head attention on $S^u$ by splitting the input into multiple segments at each time-step and applying attention to each of them individually. After computing the attention function on each segment, the Transformer module 322 concatenates the resulting vectors to get a final attentive intermediate representation $H_t^a$ for each time-step. In particular, given h heads:

$$H_t^a = [\text{head}_0 \| \text{head}_1 \| \ldots \| \text{head}_h],$$

$$S_t^u = [S_{t,0}^u \| S_{t,1}^u \| \ldots \| S_{t,h}^u],$$

$$\text{head}_i = \text{Attention}(S_{t,i}^u, S_{t,i}^u, S_{t,i}^u),$$

$$\text{Attention}(Q, K, V) = \text{Softmax}\left(\frac{Q \cdot K^T}{\sqrt{d/h}}\right) \cdot V.$$

The Transformer module 322 does not use any further affine transformations on the attention inputs $S_{t,u}^u$ before sending it to the Attention layer to prevent overfitting. Furthermore, the Transformer module 322 may explicitly mask the attention matrix with a lower triangular matrix to not include connections for future time-steps and to maintain causality. However, the overall process of the Attention layer is still linear. As such, the Transformer module 322 may add a series of non-linear, residual, feed-forward network layers to increase model capacity, as:

$$H_t = H_t^a + H_t^n,$$

$$H_t^n = \text{Conv}_2(\text{ReLU}(\text{Conv}_1(H_t^a)),$$

where $\text{Conv}_1$ and $\text{Conv}_2$ are parametrized by different bi-linear parameters $W_1, W_2 \in \mathbb{R}^{d \times d}$. Finally, the Transformer module 322 obtains a fixed-size representation of the entire sequence by extracting only the last hidden-state as processed by the Transformer, $\varepsilon_{Transformer} := H_{|G^u|}$.

The Transformer module 322 further restricts the number of elements considered by the attention matrix, as disclosed herein. While the Transformer architecture has been successful in a wide variety of applications, it is inherently quadratic and requires an order of $n^2$ memory where there is a Softmax call over an n×n attention matrix. However, in embodiments disclosed herein, only a relatively short window of previous token connections are needed for generalization in the Transformer architecture. Accordingly, in some examples, the Transformer module 322 uses a sliding-window based attention restriction mechanism that only utilizes the previous x elements for every element in the sequence.

Figure 5A:
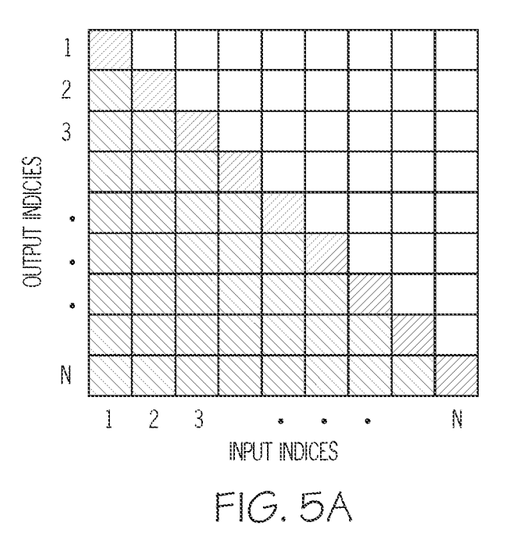
FIG. 5A depicts an attention matrix of a typical Transformer architecture.
Figure 5B:
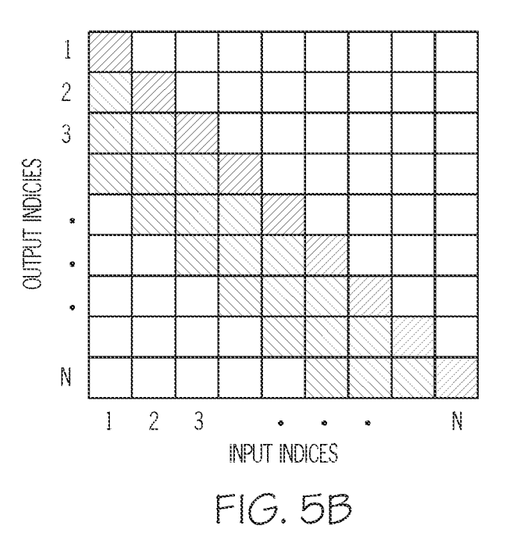
FIG. 5B depicts an attention matrix of the Transformer-RNN model maintained by the P-ACC server of FIGS. 1 and 3, according to one or more embodiments shown and described herein.

FIG. 5A shows a visualization of the attention matrix in a typical Transformer architecture, while FIG. 5B shows a visualization of the attention matrix utilized by the Transformer module 322 disclosed herein. As shown in FIG. 5A, the attention matrix for a given input element of the sequence considers every previous element. However, as shown in FIG. 5B, the attention matrix of the Transformer module 322 only considers the previous three elements for every input element in the sequence. This may provide better downstream generalization and performance of the Transformer-RNN model and may reduce the memory requirements during training, allowing the Transformer-RNN model to more easily scale to long driving trajectories. While the example of FIG. 5B considers the previous 3 elements in the attention matrix, in other examples, any number of previous elements may be considered.

Referring back to FIG. 3, the fusion module 324 may combine the RNN component and the Transformer component of the Transformer-RNN model as disclosed herein. While $\varepsilon_{Transformer}$ can be computed in a computer-efficient manner, it lacks very distant context due to the restriction of the number of elements considered for attention. As such, in embodiments, $\varepsilon_{Transformer}$ may be combined with $\varepsilon_{GRU}$, which has access to the entire driving trajectory. Accordingly, this allows the Transformer-RNN model to enjoy the benefits of both the Transformer architecture and the RNN architecture. In particular, $\varepsilon_{Transformer}$ provides a sophisticated modeling of shorter driving contexts, while $\varepsilon_{GRU}$ provides an easy-to-scale representation of the distant driving context. As such, the disclosed Transformer-RNN model, which combines both, may be accurate and easy-to-scale. Furthermore, in embodiments, the fusion module 324 may infer the importance of the GRU and Transformer architecture embeddings by learning two scalar parameters $\alpha$, $\beta \in \mathbb{R}$ and determining a weighted average:

$$\varepsilon = (\alpha' \cdot \varepsilon_{GRU}) + (\beta' \cdot \varepsilon_{Transformer}),$$

$$[\alpha', \beta'] = \text{Softmax}([\alpha, \beta]).$$

The fusion module 324 further performs a series of non-linear affine transformations to predict the desired gap at the next time-step:

$$\hat{G}_{|G^u|+1}{}^u = G_{|G^u|}{}^u + \Delta u,$$

$$\Delta u = (F_2^T \cdot \text{ReLU}(F_1^T \varepsilon + b_1)) + b_2,$$

where $F_1 \in \mathbb{R}^{d \times d}$, $F_2 \in \mathbb{R}^{d \times 1}$, and $b_1$, $b_2 \in \mathbb{R}$ represent parameters for decoding $\varepsilon$ to predict the desired gap. In embodiments, a change in gap from a previous time-step is predicted rather than the absolute gap itself, in order to eliminate redundant learning and directly focus on driver trajectory modeling.

Referring back to FIG. 3, the training module 326 may train the Transformer-RNN model maintained by the P-ACC server 102 by optimizing the parameters of the model as disclosed herein. To simplify notation, let $\phi_\theta: (G^u, C^u) \to \mathbb{R}$ represent the Transformer-RNN algorithm. In embodiments, the training module 326 optimizes $\theta$ to minimize a point-wise mean squared error between the predicted and actual gaps using the following optimization equation:

$$\arg_\theta \min \Sigma_{u \in U} \Sigma_{t=1}^{|G^u|} (\phi_\theta(G_{1:t}{}^u, C_{1:t}{}^u) - G_{t+1}{}^u)^2 + \lambda \cdot \|\theta\|_2^2,$$

where U represents the set of all drivers in a dataset, $G_{1:t}{}^u$, $C_{1:t}{}^u$ represent the gap and context trajectories for driver u up to the $t^{th}$ time-step respectively, and $\lambda$ is a regularization constant. In the illustrated example, the training module 326 optimizes this equation using mini-batch stochastic gradient descent. However, in other examples, the training module 326 may optimize this equation using other optimization methods.

In the above described optimization algorithm, the training module 326 trains the Transformer-RNN model to predict the gap for the next time step for a driver based on a sequence of gaps at previous time steps. However, in some examples, the training module 326 may utilize a Horizon algorithm to train the Transformer-RNN model to predict a plurality of distance gaps for a fixed horizon of k steps in the future. In these examples, the Transformer-RNN model may learn long-term trajectory dynamics and driver traits, rather than a greedy next-gap prediction. In addition, this long-term prediction may provide more gradient for better generalization, while being more stable and faster to converge.

In particular, in examples where the training module 326 uses the Horizon algorithm to predict gaps for k future time steps, the optimization equation above is modified by changing the dimensionality of $F_2 \in \mathbb{R}^{d \times 1} \to F_2 \in \mathbb{R}^{d \times k}$, and modifying the optimization equation to the following:

$$\arg_\theta \min \Sigma_{u \in U} \Sigma_{t=1}^{|G^u|-k} \Sigma_{i=1}^k (\phi_{\theta,i}(G_{1:t}{}^u, C_{t+1}{}^u) - G_{t+1}{}^u)^2 + \lambda \cdot \|\theta\|_2^2,$$

where $\phi_{\theta,i}$ represents the $i^{th}$ output of $\phi$. This Horizon algorithm is generic and may be applied to any autoregressive model as long as it predicts future events through some set of learnable parameters.

In order to evaluate the performance and robustness of the disclosed Transformer-RNN model, experiments were performed on sample data. One data set used was Open-ACC, which is a car-following data set that was originally intended to better understand ACC characteristics of modern vehicles. Open-ACC collects data where a platoon of vehicles are following each other. To obtain appropriate data for the Transformer-RNN model, all vehicle trajectories in the platoon were considered independently, resulting in n−1 trajectories for each platoon trajectory of n vehicles. In addition, a second proprietary data set was synthesized by asking five different drivers to generate car-following data using the Unity game engine.

Figure 6A:
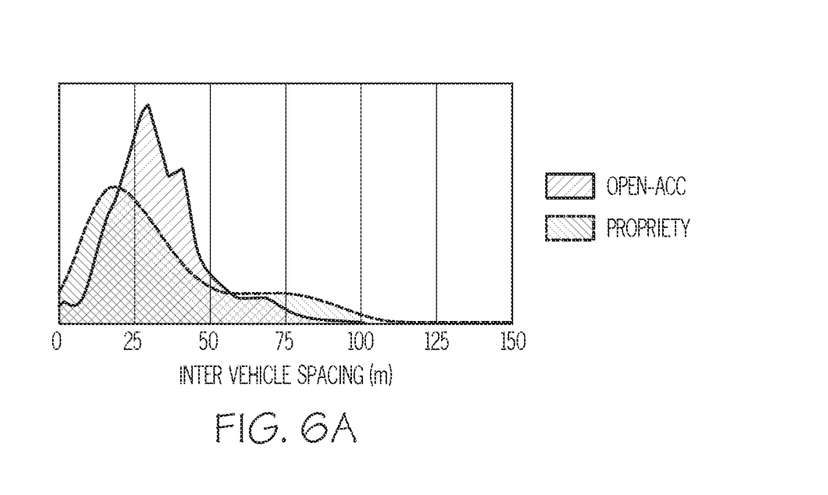
FIG. 6A illustrates gap distributions for sample data from two example data sets described herein.
Figure 6B:
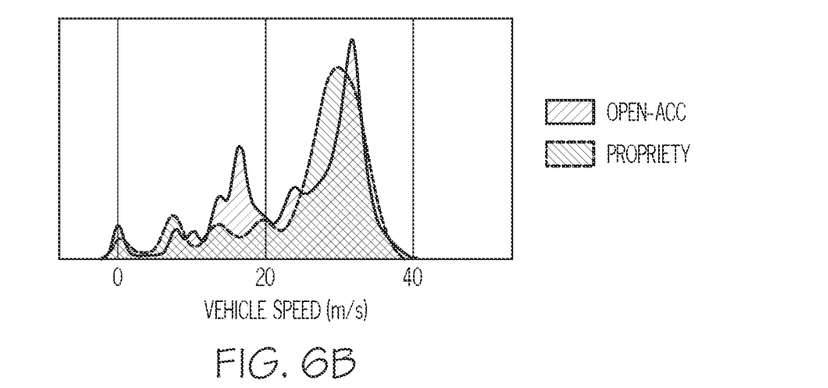
FIG. 6B illustrates vehicle speed distributions for the sample data from the two example data sets described herein.

The driving trajectories for both data sets were sampled at a rate of 10 Hz, and characteristics such as vehicle type, ego vehicle speed, lead vehicle speed, distance gap, and time gap were logged. FIGS. 6A and 6B show gap distribution and vehicle speed distribution for the two data sets. As can be seen in FIGS. 6A and 6B, both data sets have similar gap and speed distributions.

To compare the performance of different models, a root mean square error (RMSE)-based prediction horizon scheme is employed. In particular, given a gap prediction function $\phi: (G^u, C^u) \to \mathbb{R}$, a metric of interest $RMSE_{mean}$ is defined as:

$$RMSE_{mean} = \frac{1}{\tau} \cdot \sum_{t=1}^{\tau} RMSE@k,$$

$$RMSE@k = \sqrt{\sum_{u \in U} (\phi_t(G^u, C^u) - G'_{|G^u|+t})^2},$$

where $\tau$ represents a fixed prediction horizon to evaluate a model on. In the illustrated examples, $\tau$ is fixed to be $100 \approx =10$ s. However, in other examples, $\tau$ can be chosen to have other values. In the above equations, U represents the set of all drivers in a data set, and $\phi_t(G^u, C^u)$ represents a prediction made by $\phi$ for the $t^{th}$ time step in the future.

The two data sets were then used to compare the disclosed Transformer-RNN model to a variety of other models including Copy, Linear, MLP, MLP Horizon, RNN, Transformer, Gap-former, RNN Horizon, and Transformer Horizon. The copy model simply copies the previous gap and maintains the previous gap regardless of any contact. The Linear model predicts a next time step gap to be a step in the same direction and the same amount as the driver did in the previous time step. The MLP model uses a multilayer perceptron to make gap predictions. The RNN model uses Long Short-Term Memory (LSTM) to make gap predictions. The Transformer model uses standard Transformer architecture. The MLP Horizon, RNN Horizon, and Transformer Horizon, modify the MLP, RNN, and Transformer models, respectively, to only consider a fixed horizon of past time step data, as discussed above. The Gap-former model uses modified Transformer architecture.

Figure 7:
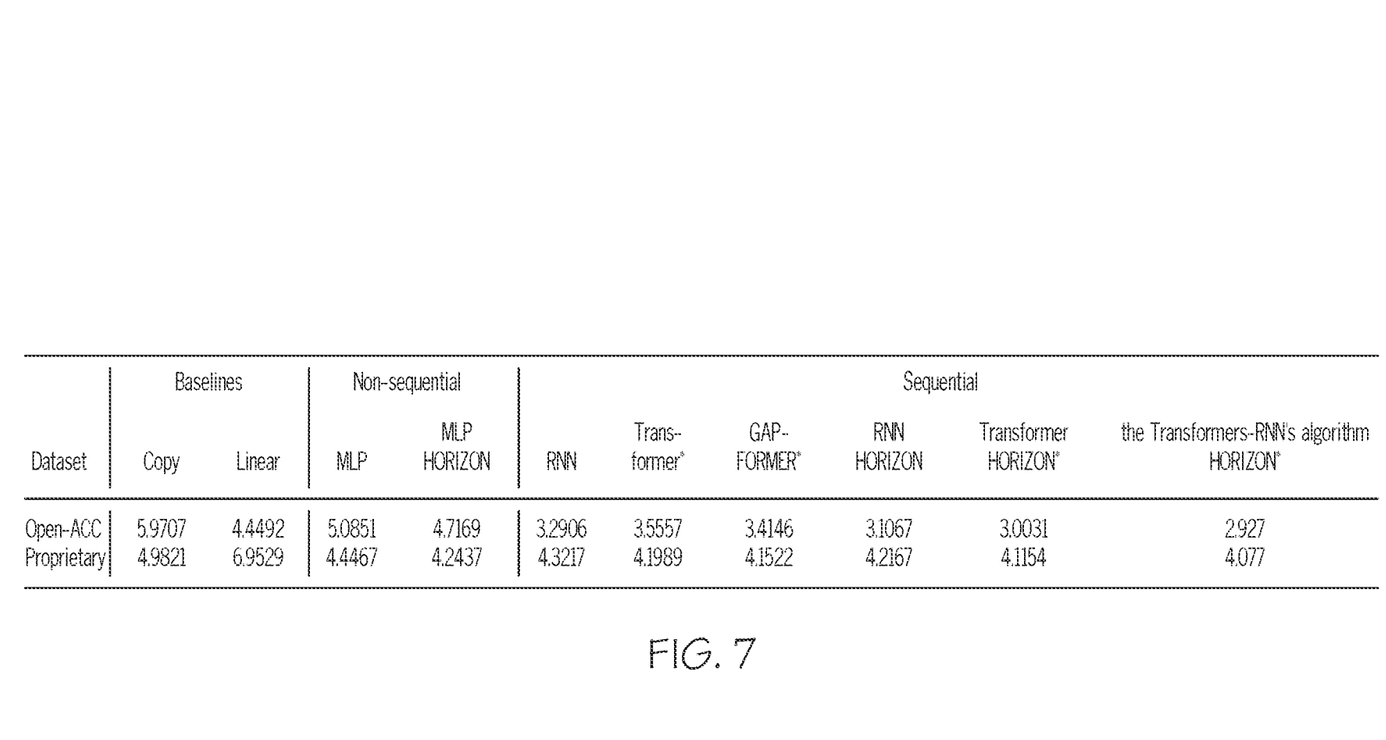
FIG. 7 shows a table of root mean square error values for a plurality of different models.

FIG. 7 shows a table with the RMSE mean values for each of the models as well as the disclosed Transformer-RNN model for the two data sets. As can be seen in FIG. 7, the Transformer-RNN model outperforms all of the other models on both data sets.

Referring back to FIG. 3, the gap prediction module 328 predicts a gap between the ego vehicle 104 and the lead vehicle 106 at a future time step based on vehicle data received during on-line operation. In particular, when the ego vehicle 104 operates P-ACC service, the ego vehicle 104 transmits vehicle data to the P-ACC server 102, which is received by the vehicle data reception module 314. The gap prediction module 328 inputs the received driving information into the trained Transformer-RNN model, which outputs a predicted gap for the next time step that mimics the ego vehicle driver's naturalistic driving tendencies. That is, the trained Transformer-RNN model outputs a predicted gap that the driver of the ego vehicle 104 would prefer if the driver were perform manual driving of the vehicle. As such, the P-ACC server 102 can cause the ego vehicle 104 to autonomously reach the predicted gap at the next time step to make the driver more comfortable with the ACC system, thereby providing personalized ACC.

The driving instruction determination module 330 may determine a driving action (e.g., accelerating or decelerating a particular amount) to cause the ego vehicle 104 to achieve the desired gap with the lead vehicle 106 at the next time step. The driving instruction transmission module 332 may then transmit the determined driving action to the ego vehicle 104 to cause the ego vehicle 104 to perform the specified driving action.

Figure 8:
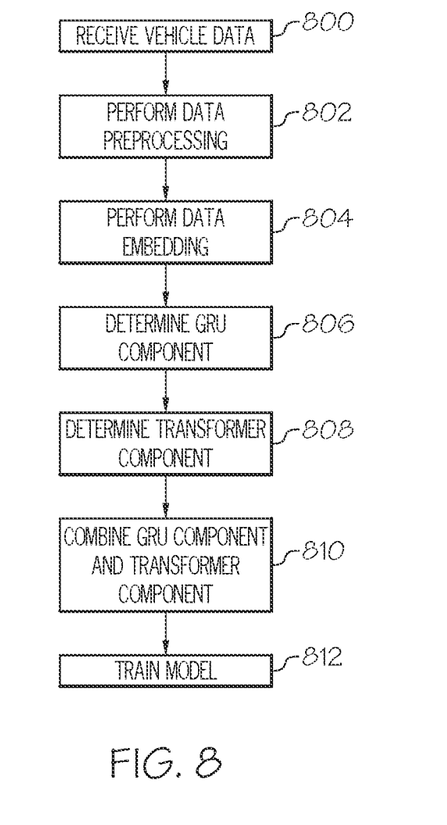
FIG. 8 depicts a flowchart of a method of operating the P-ACC server of FIGS. 1 and 3 to train the Transformer-RNN model, according to one or more embodiments shown and described herein.

FIG. 8 depicts a flowchart of an example method for operating the P-ACC server 102 to train the Transformer-RNN model for a particular driver. At step 800, the vehicle data reception module 314 receives vehicle data associated with a driver. In particular, the vehicle data reception module 314 receives driving data associated with driving situations when the driver is performing manual driving of a vehicle while following another vehicle.

At step 802, the data preprocessing module 316 performs preprocessing of the data received by the vehicle data reception module 314. In particular, the data preprocessing module 316 extracts a time series of gap data and a time series of contextual data associated with the driver in vehicle following driving situations.

At step 804, the vehicle data embedding module 318 embeds the data processed by the data preprocessing module 316 into an embedding to be input into the Transformer-RNN model. In particular, the vehicle data embedding module 318 transforms the gap data sequence and the contextual data sequence into sequences of a fixed length and concatenates the two fixed length sequences. The vehicle data embedding module 318 then performs an affine MLP transformation of the concatenated sequence and inputs a learnable position embedding to obtain an input embedding.

At step 806, the GRU module 320 determines a GRU component comprising a GRU representation of the input embedding. In particular, the GRU module 320 employs a GRU to embed the input embedding into a lower dimensional latent space. The GRU module 320 then extracts the last hidden-state to obtain the GRU component.

At step 808, the transformer module 322 determines a transformer component comprising a transformer representation of the input embedding. In particular, the transformer module 322 performs multi-head attention on the input embedding to obtain an intermediate sequence. The transformer module 322 then extracts the last hidden-state to obtain the transformer component. The transformer module 322 restricts the number of elements considered by the attention matrix to a fixed amount of past elements.

At step 810, the fusion module 324 combines the GRU component determined by the GRU module 320 and the transformer component determined by the transformer module 322. In embodiments, the fusion module 324 may combine the GRU component and the transformer component by determine a weighted average of each component.

At step 812, the training module 326 trains the Transformer-RNN model based on the GRU component and the transformer component. In particular, the training module 326 optimizes model parameters to minimize mean squared error between predicted and actual gaps based on the training data. The learned parameters of the Transformer-RNN model may be stored in the database 312.

Figure 9:
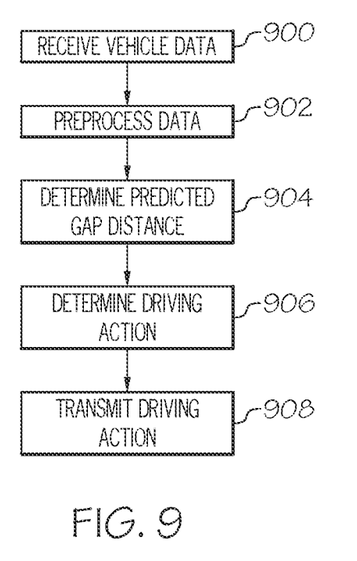
FIG. 9 depicts a flowchart of a method of operating the P-ACC server of FIGS. 1 and 3 after the Transformer-RNN model has been trained, according to one or more embodiments shown and described herein.

FIG. 9 depicts a flowchart of an example method for operating the P-ACC server 102 after the Transformer-RNN model has been trained. At step 900, the vehicle data reception module 314 receives driving data from the ego vehicle 104 while it is following the lead vehicle 106. At step 902, the data preprocessing module 316 processes the data received by the vehicle data reception module 314 to determine a sequence of gap data and a sequence of contextual data for the ego vehicle 104 while following the lead vehicle 106.

At step 904, the gap prediction module 328 inputs the processed sequence of gap data and sequence of contextual data into the trained Transformer-RNN model. The trained model then outputs a predicted gap between the ego vehicle 104 and the lead vehicle 106 at the next time step based on the input data.

At step 906, the driving instruction determination module 330 determines a driving instruction to be performed by the ego vehicle 104 to achieve the predicted gap at the next time step. At step 908, the driving instruction transmission module 332 transmits the determined driving instruction to the ego vehicle 104 to cause the ego vehicle 104 to perform the determined driving action to achieve the predicted gap.

It should now be understood that embodiments described herein are directed to a method and system for personalized car following with transformers and RNNs. While a driver is manually driving a vehicle while following another vehicle, driving data may be collected. The driving data may be used to train a Transformer-RNN model to predict a following distance preferred by the driver at a subsequent time step based on following distance and other data for a plurality of previous time steps. The Transformer-RNN model may utilize elements of Transformer architecture and elements of RNN architecture.

After the Transformer-RNN model is trained, a vehicle may utilize the model to perform personalized adaptive cruise control. In particular, vehicle data may be collected while the vehicle is performing P-ACC and the vehicle data may be input into the trained Transformer-RNN model. The trained model may output a predicted vehicle following gap for the next time step based on the input vehicle data. The vehicle may then perform a driving action to achieve the predicted gap at the next time step. By performing P-ACC in a manner to drive with gap following behavior similar to how a driver of the vehicle would naturalistically drive, the drive may feel more comfortable utilizing the P-ACC system.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method comprising:
receiving training data comprising a time series of gaps between an ego vehicle and one or more lead vehicles at a plurality of time steps;
embedding the training data into a fixed-length sequence;
inputting the fixed-length sequence into a Transformer-RNN model comprising a Transformer component and an RNN component, wherein the Transformer component applies attention to each data point of the fixed-length sequence based on a fixed number of previous inputs;
training the Transformer-RNN model to learn weighted averages to be used to combine an output of the Transformer component and an output of the RNN component;
combining the output of the Transformer component of the Transformer-RNN model and the output of the RNN component of the Transformer-RNN model to obtain a combined input sequence;
training the Transformer-RNN model, based on the combined input sequence, to output a predicted gap at a future time step based on an input sequence of gaps;
determining a driving action to be performed by the ego vehicle to achieve the predicted gap; and
causing the ego vehicle to perform the determined driving action.

2. The method of claim 1, wherein the training data further comprises a speed of the ego vehicle at the plurality of time steps.

3. The method of claim 1, wherein the training data further comprises speeds of the one or more lead vehicles at the plurality of time steps.

4. The method of claim 1, wherein the Transformer component of the Transformer-RNN model further performs an affine Multi-Layer Perceptron transformation of the fixed-length sequence, and injects a learnable position embedding.

5. The method of claim 1, wherein the RNN component of the Transformer-RNN model utilizes a gated recurrent unit to embed the fixed-length sequence into a lower dimensional latent space.

6. The method of claim 1, further comprising:
training the Transformer-RNN model to minimize a pointwise mean squared error between predicted gaps output by the Transformer-RNN model and actual gaps based on the training data.

7. The method of claim 1, further comprising:
receiving on-line data from the ego vehicle during operation of personalized adaptive cruise control while the ego vehicle is following a lead vehicle; and
inputting the on-line data into the trained Transformer-RNN model to predict a gap between the ego vehicle and the lead vehicle at a subsequent time step based on an output of the trained Transformer-RNN model.

8. A remote computing device comprising a controller programmed to:
receive training data comprising a time series of gaps between an ego vehicle and one or more lead vehicles at a plurality of time steps;
embed the training data into a fixed-length sequence;
input the fixed-length sequence into a Transformer-RNN model comprising a Transformer component and an RNN component, wherein the Transformer component applies attention to each data point of the fixed-length sequence based on a fixed number of previous inputs;
train the Transformer-RNN model to learn weighted averages to be used to combine an output of the Transformer component and an output of the RNN component;
combine the output of the Transformer component of the Transformer-RNN model and the output of the RNN component of the Transformer-RNN model to obtain a combined input sequence;
train the Transformer-RNN model, based on the combined input sequence, to output a predicted gap at a future time step based on an input sequence of gaps;
determine a driving action to be performed by the ego vehicle to achieve the predicted gap; and
cause the ego vehicle to perform the determined driving action.

9. The remote computing device of claim 8, wherein the training data further comprises a speed of the ego vehicle at the plurality of time steps.

10. The remote computing device of claim 8, wherein the training data further comprises speeds of the one or more lead vehicles at the plurality of time steps.

11. The remote computing device of claim 8, wherein the Transformer component of the Transformer-RNN model further performs an affine Multi-Layer Perceptron transformation of the fixed-length sequence, and injects a learnable position embedding.

12. The remote computing device of claim 8, wherein the RNN component of the Transformer-RNN model utilizes a gated recurrent unit to embed the fixed-length sequence into a lower dimensional latent space.

13. The remote computing device of claim 8, wherein the controller is further programmed to:
train the Transformer-RNN model to minimize a pointwise mean squared error between predicted gaps output by the Transformer-RNN model and actual gaps based on the training data.

14. The remote computing device of claim 8, wherein the controller is further programmed to:
receive on-line data from the ego vehicle during operation of personalized adaptive cruise control while the ego vehicle is following a lead vehicle; and
input the on-line data into the trained Transformer-RNN model to predict a gap between the ego vehicle and the lead vehicle at a subsequent time step based on an output of the trained Transformer-RNN model.

15. A system comprising:
a vehicle comprising one or more vehicle sensors configured to collect sensor data comprising at least a distance between the vehicle and a lead vehicle being followed by the vehicle at a plurality of time steps; and
a remote computing device comprising a controller programmed to:
receive the sensor data from the vehicle;
embed the sensor data into a fixed-length sequence;
input the fixed-length sequence into a trained Transformer-RNN model comprising a Transformer component and an RNN component, wherein the Transformer component applies attention to each data point of the fixed-length sequence based on a fixed number of previous inputs;

train the Transformer-RNN model to learn weighted averages to be used to combine an output of the Transformer component and an output of the RNN component;
combine the output of the Transformer component of the Transformer-RNN model and the output of the RNN component of the Transformer-RNN model to obtain a combined input sequence;
train the Transformer-RNN model, based on the combined input sequence, to output a predicted gap at a future time step based on an input sequence of gaps;
determine a driving action to be performed by the vehicle to achieve the predicted gap at the future time step; and
cause the vehicle to perform the determined driving action.

* * * * *